(12) United States Patent
Glusman et al.

(10) Patent No.: US 11,375,445 B2
(45) Date of Patent: Jun. 28, 2022

(54) TECHNOLOGIES FOR DETECTING AND ANALYZING USER INTERACTION TESTS FOR NETWORK-ACCESSIBLE CONTENT

(71) Applicant: Do What Works, LLC, Middletown, NJ (US)

(72) Inventors: Emilio Andres Glusman, Middletown, NJ (US); William Howard, Brooklyn, NY (US)

(73) Assignee: Do What Works, LLC, Middletown, NJ (US)

( * ) Notice: Subject to any disclaimer, the term of this patent is extended or adjusted under 35 U.S.C. 154(b) by 89 days.

(21) Appl. No.: 16/914,729

(22) Filed: Jun. 29, 2020

(65) Prior Publication Data

US 2021/0410056 A1 Dec. 30, 2021

(51) Int. Cl.
*H04W 48/18* (2009.01)
*H04W 48/16* (2009.01)
*H04L 67/02* (2022.01)
*H04N 7/18* (2006.01)
*G06V 20/52* (2022.01)

(52) U.S. Cl.
CPC ............ *H04W 48/18* (2013.01); *G06V 20/52* (2022.01); *H04L 67/02* (2013.01); *H04N 7/181* (2013.01); *H04W 48/16* (2013.01)

(58) Field of Classification Search
CPC ..... H04W 58/18; H04W 58/16; H04W 48/18; H04W 48/16; H04L 67/02; H04N 7/181; G06K 9/00771; G06V 20/52
See application file for complete search history.

(56) References Cited

U.S. PATENT DOCUMENTS

| | | | |
|---|---|---|---|
| 7,917,618 B1* | 3/2011 | Bettis | G06T 7/0002 709/224 |
| 9,479,519 B1* | 10/2016 | Hill | H04L 63/1441 |
| 2003/0050923 A1* | 3/2003 | Chang | G06F 16/9032 |

OTHER PUBLICATIONS

Internet Archive, "Using The Wayback Machine," accessed Jun. 29, 2020, 6 pages.
Internet Archive, "Save Pages in the Wayback Machine," accessed Jun. 29, 2020, 6 pages.
Internet Archive, "Wayback Machine General Information," accessed Jun. 29, 2020, 5 pages.

\* cited by examiner

*Primary Examiner* — Kristie D Shingles
(74) *Attorney, Agent, or Firm* — Barnes & Thornburg LLP

(57) ABSTRACT

Technologies for detecting and analyzing user interaction tests for network-accessible content include a compute device. The compute device includes circuitry configured to obtain samples of network-accessible content. The circuitry is additionally configured to determine, based on the obtained samples, whether multiple variants of the network-accessible content are present. Further, the circuitry is configured to monitor, in response to a determination that multiple variants are present, a statistical user interaction test associated with the variants, including detecting a final variant and discontinuation of other variants in the statistical user interaction test. Additionally, the circuitry is configured to provide data indicative of the detected final variant of the network-accessible content.

20 Claims, 11 Drawing Sheets

TECHNOLOGIES FOR DETECTING AND ANALYZING USER INTERACTION TESTS FOR NETWORK-ACCESSIBLE CONTENT

BACKGROUND

Companies produce network-accessible content such as web pages, search engine marketing (e.g., short messages such as words or phrases, also referred to as "headlines," that appear as search results and are each associated with a link to a landing page), and/or other human viewable items designed to evoke a desired response from a user accessing the content through a network (e.g., the internet). The desired response may be to click on a button or link in the content, to sign up for a product or service, or to take some other action. The effectiveness of such content to obtain the desired response has been shown, through statistical tests, to vary due to subtle changes in the content, such as changes to the size or placement of a button, the particular wording used to convey a message, and/or other factors that affect the appearance of the content to a viewer.

SUMMARY

In one aspect, the present disclosure provides a compute device. The compute device includes circuitry configured to obtain samples of network-accessible content. The circuitry is also configured to determine, based on the obtained samples, whether multiple variants of the network-accessible content are present. In addition, the circuitry is configured to monitor, in response to a determination that multiple variants are present, a statistical user interaction test associated with the variants, including detecting a final variant and discontinuation of other variants in the statistical user interaction test. Further, the circuitry is configured to provide data indicative of the detected final variant of the network-accessible content.

In another aspect, the present disclosure describes one or more machine-readable storage media having instructions stored thereon that, in response to being executed, cause a compute device to obtain samples of network-accessible content. The instructions also cause the compute device to determine, based on the obtained samples, whether multiple variants of the network-accessible content are present. In addition, the instructions cause the compute device to monitor, in response to a determination that multiple variants are present, a statistical user interaction test associated with the variants, including detecting a final variant and discontinuation of other variants in the statistical user interaction test. In addition, the instructions cause the compute device to provide data indicative of the detected final variant of the network-accessible content.

In yet another aspect, the present disclosure includes a method that includes obtaining, by a compute device, samples of network-accessible content. The method also includes determining, by the compute device and based on the obtained samples, whether multiple variants of the network-accessible content are present. Additionally, the method includes monitoring, by the compute device and in response to a determination that multiple variants are present, a statistical user interaction test associated with the variants, including detecting a final variant and discontinuation of other variants in the statistical user interaction test. Further, the method includes providing, by the compute device, data indicative of the detected final variant of the network-accessible content.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
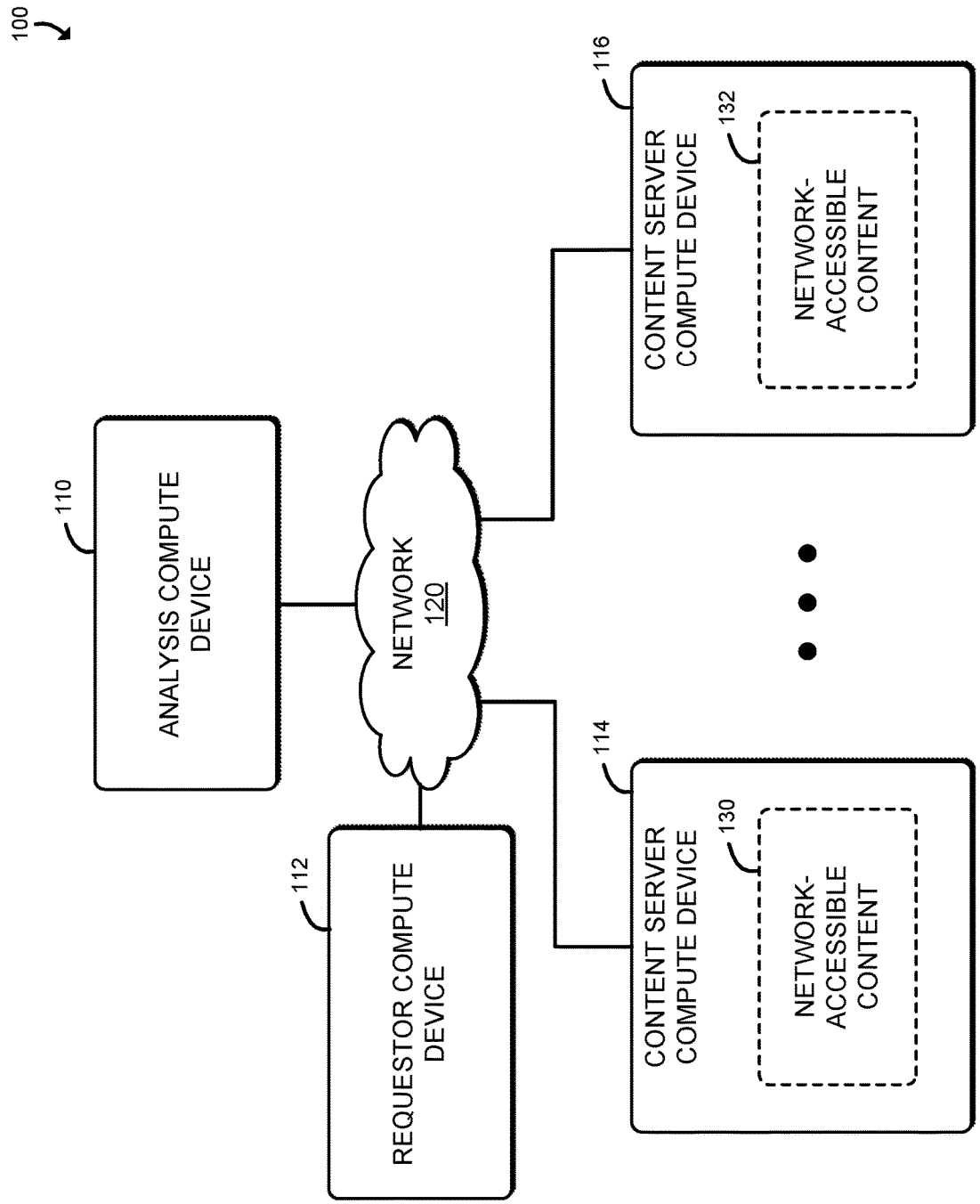
FIG. 1 is a simplified diagram of at least one embodiment of a system for detecting and analyzing user interaction tests for network-accessible content.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for detecting and analyzing user interaction tests for network-accessible content includes an analysis compute device 110, a requestor compute device 112, and a set of content server compute devices 114, 116. The analysis compute device 110 is illustratively configured to continually monitor network-accessible content 130, 132 (e.g., accessible from the content server compute devices 114, 116, through a network 120), detect variants of a given item of network-accessible content, such as versions of the content that have different visual aspects, such as different text, differently sized user interface components, different color schemes, or other differing features indicative of a statistical user interaction test being performed by a business entity (e.g., a company) associated with the network-accessible content, and determine which variant ultimately was most effective at obtaining a desired user response (e.g., clicking on a button, signing up for a product or service, etc.) as evidenced by the discontinuation of all but a single final variant of the content. Additionally, the analysis compute device 110 may, in response to a request, such as from the requestor compute device 112, provide data indicative of the results of statistical user interaction tests that were detected and analyzed by the analysis compute device 110, such as side-by-side representations of a final (e.g., successful) variant of a network-accessible content item and one or more other variants that were discontinued (e.g., unsuccessful) in the test. Further, the analysis compute device 110 may identify, from an analysis of multiple user interaction tests, patterns or trends in the appearance of network-accessible content that correspond with a higher likelihood of success in obtaining a desired user response and provide such information upon request (e.g., to a user of the requestor compute device 112).

Figure 2:
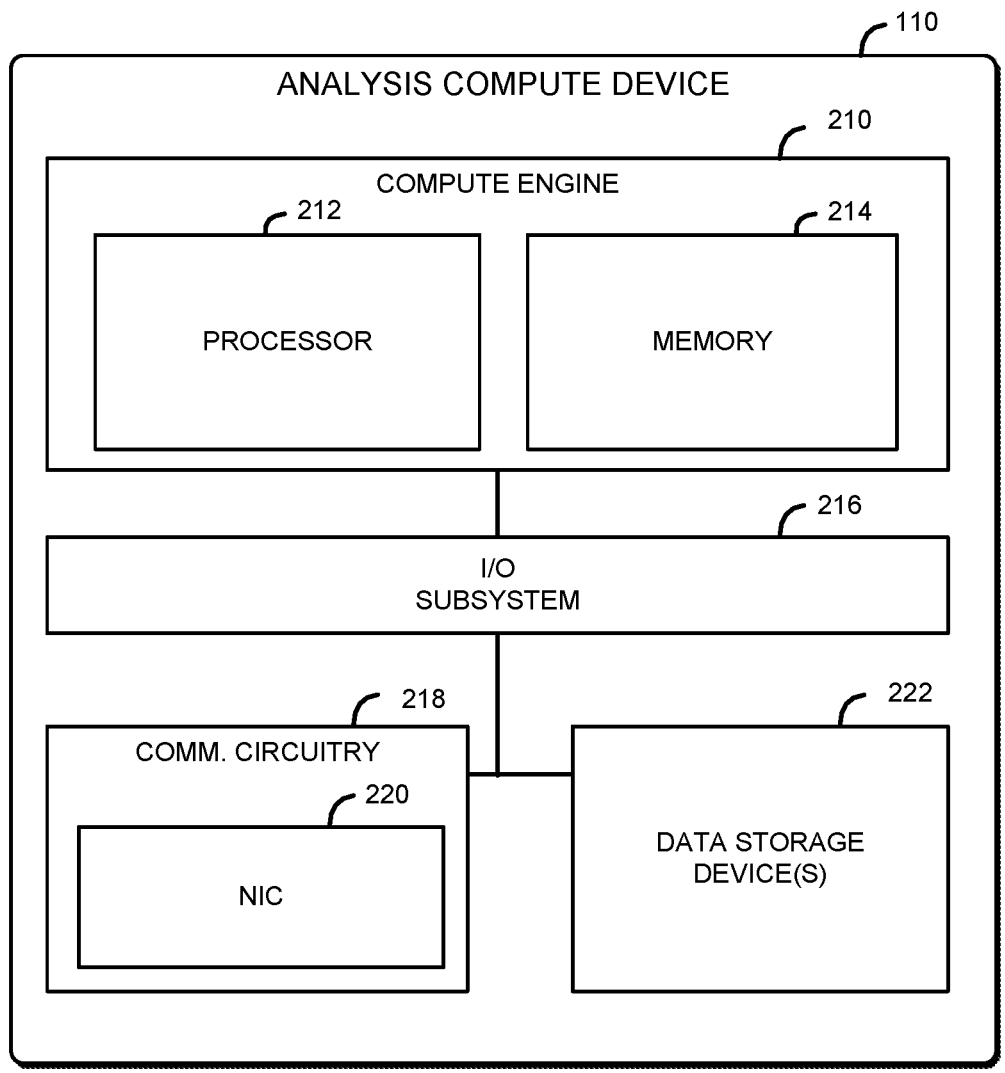
FIG. 2 is a simplified block diagram of at least one embodiment of an analysis compute device included in the system of FIG. 1.

Referring now to FIG. 2, the illustrative analysis compute device 110 includes a compute engine (also referred to herein as "compute engine circuitry") 210, an input/output (I/O) subsystem 216, communication circuitry 218, and one or more data storage devices 222. Of course, in other embodiments, the analysis compute device 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein. For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, all or a portion of the main memory 214 may be integrated into the processor 212. In operation, the main memory 214 may store various software and data used during operation such as applications, libraries, and drivers.

The compute engine 210 is communicatively coupled to other components of the analysis compute device 110 via the I/O subsystem 216, which may be embodied as circuitry and/or components to facilitate input/output operations with the compute engine 210 (e.g., with the processor 212 and/or the main memory 214) and other components of the analysis compute device 110. For example, the I/O subsystem 216 may be embodied as, or otherwise include, memory controller hubs, input/output control hubs, integrated sensor hubs, firmware devices, communication links (e.g., pointto-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the analysis compute device 110, into the compute engine 210.

The communication circuitry 218 may be embodied as any communication circuit, device, or collection thereof, capable of enabling communications over the network 120 between the analysis compute device 110 and another device (e.g., the requestor compute device 112, the content server compute devices 114, 116, etc.). The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 220. The NIC 220 may be embodied as one or more add-in-boards, daughter cards, network interface cards, controller chips, chipsets, or other devices that may be used by the analysis compute device 110 to connect with another compute device (e.g., the requestor compute device 112, the content server compute devices 114, 116, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the analysis compute device 110 at the board level, socket level, chip level, and/or other levels.

Each data storage device 222, may be embodied as any type of device configured for short-term or long-term storage of data such as, for example, memory devices and circuits, memory cards, hard disk drives, solid-state drives, or other data storage device. Each data storage device 222 may include a system partition that stores data and firmware code for the data storage device 222 and one or more operating system partitions that store data files and executables for operating systems. Though shown as a single unit, it should be understood that in some embodiments, the components of the analysis compute device 110 may be disaggregated (e.g., located in different racks, different portions of a data center, etc.).

The requestor compute device 112 and the content server compute devices 114, 116 may have components similar to those described in FIG. 2 with reference to the analysis compute device 110. The description of those components of the analysis compute device 110 is equally applicable to the description of components of the requestor compute device 112 and the content server compute devices 114, 116. Further, it should be appreciated that any of the compute devices 110, 112, 114, 116 may include other components, sub-components, and devices commonly found in a computing device (e.g., a display device), which are not discussed above in reference to the analysis compute device 110 and not discussed herein for clarity of the description.

As described above, the compute devices 110, 112, 114, 116 are illustratively in communication via the network 120, which may be embodied as any type of wired or wireless communication network, including global networks (e.g., the internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), a radio area network (RAN), digital subscriber line (DSL) networks, cable networks (e.g., coaxial networks, fiber networks, etc.), or any combination thereof.

Figure 3:
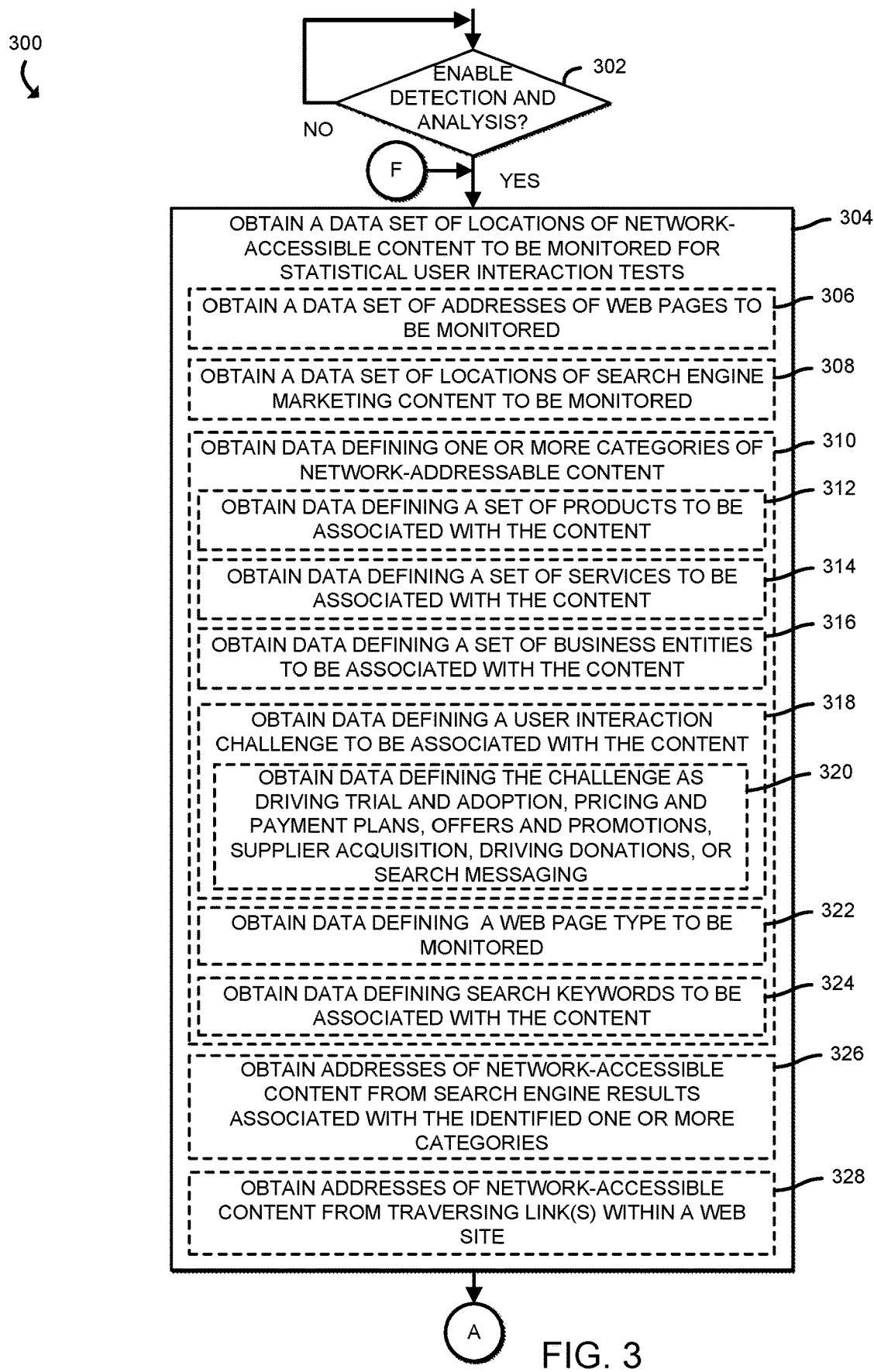
FIGS. 3-9 are simplified block diagrams of at least one embodiment of a method for detecting and analyzing user interaction tests for network-accessible content that may be performed by an analysis compute device of the system of FIG. 1.

Referring now to FIG. 3, the analysis compute device 110, in operation, may execute a method 300 for detecting and analyzing user interaction tests for network-accessible content (e.g., web pages, search result headlines that link to web pages (e.g., landing pages), etc.). The method 300 begins with block 302, in which the analysis compute device 110 determines whether to enable detection and analysis of user interaction tests for network-accessible content (e.g., the network-accessible content 130, 132). In making the determination, the analysis compute device 110 may determine whether a configuration setting (e.g., stored in a configuration file in the data storage device 222) indicates that detection and analysis should be enabled, whether a request (e.g., from an administrator of the analysis compute device 110 or from another compute device, such as from the requestor compute device 112) has been received to enable detection and analysis, and/or based on other factors. Regardless, in response to a determination to enable detection and analysis, the method 300 advances to block 304 in which the analysis compute device 110 obtains (e.g., produces, receives from another source such as from one or more other compute devices, from manual entry by a human operator, etc.) a data set of locations of network-accessible content to be monitored for statistical user interaction tests. In doing so, and as indicated in block 306, the analysis compute device 110 may obtain a data set of addresses (e.g., uniform resource locators (URLs)) of web pages to be monitored, as indicated in block 306. Additionally or alternatively, and as indicated in block 308, the analysis compute device 110 may obtain a data set indicative of locations of search engine marketing content to be monitored, such as an address (e.g., URL) of a search engine and criteria (e.g., keywords) for accessing corresponding search engine marketing content (e.g., search headlines) to be monitored.

In the illustrative embodiment, the analysis compute device 110 may obtain data defining one or more categories of network-addressable content to be monitored, as indicated in block 310. As indicated in block 312, the analysis compute device 110 may obtain data defining a set of products to be associated with the content. Additionally or alternatively, the analysis compute device 110 may obtain data defining a set of services to be associated with the content, as indicated in block 314. In some embodiments, the analysis compute device 110 may obtain data defining a set of business entities (e.g., company names to be associated with the content, such as names of companies that compete in a particular category of goods and/or services), as indicated in block 316.

Additionally or alternatively, and as indicated in block 318, the analysis compute device 110 may obtain data defining a user interaction challenge (e.g., a desired user response) associated with the content. For example, and as indicated in block 320, the analysis compute device 110 may obtain data defining a challenge as driving trial and adoption, pricing and payment plans, offers and promotions, supplier acquisition, driving donations, and/or search messaging. In some embodiments, the analysis compute device 110 may obtain data defining a web page type (e.g., assessment page, category page, checkout page, discovery page, donation page, find locations page, gift page, home page, how it works page, individual item/product page, navigation, pricing page, promotional page, recruit hosts/sellers page, seller/host acquisition page, service provider acquisition page, signup page, site wide page) to be monitored, as indicated in block 322. Additionally or alternatively, the analysis compute device 110 may obtain data defining search keywords to be associated with content that is to be monitored, as indicated in block 324. The analysis compute device 110 may obtain addresses of network-accessible content from search engine results associated with the one or more categories (e.g., by obtaining, from a search engine, URLs for company web sites associated with searches for defined categories of goods or services), as indicated in block 326. Additionally or alternatively, and as indicated in block 328, the analysis compute device 110 may obtain addresses of network-accessible content by traversing links (e.g., hypertext markup language (HTML) links) within web site(s), such as by starting from a home page or landing page of a company's web site and crawling or navigating the web site to identify web pages within the web site corresponding to one or more of the defined challenges (e.g., as described with reference to block 318 and 320) and/or page types (e.g., as described with reference to block 322). Subsequently, the method 300 advances to block 330 of FIG. 4, in which the analysis compute device monitors network-accessible content (e.g., at the locations defined in the data set of block 304) to detect variants of the network-accessible content associated with statistical user interaction tests.

Figure 4:
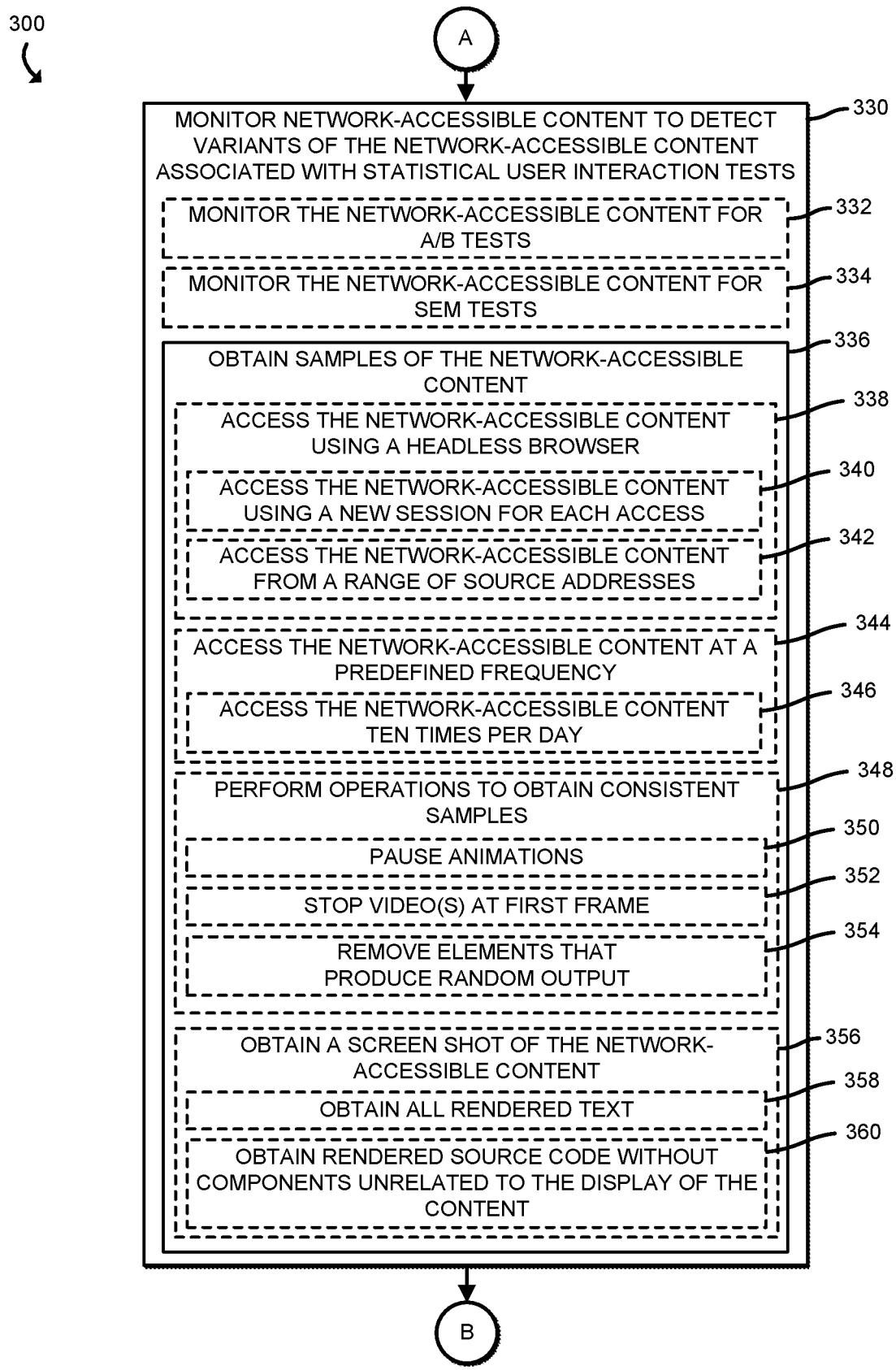

Referring now to FIG. 4, in monitoring the network-accessible content to detect variants (e.g., indicative of a statistical user interaction test occurring), the analysis compute device 110 may monitor network-accessible content for AB tests, also referred to as split tests, in which one of multiple available variants of a web page or other network-accessible content is provided by a server compute device (e.g., the content server compute device 114) in response to a request for the content, as indicated in block 332. For example, the analysis compute device 110 may request content from a server compute device (e.g., the content server compute device 114) and receive, in response, variant A of the content in which a particular button (e.g., a "sign up") button is one size or may receive variant B of the content in which the button is a different size (e.g., 10% larger). Additionally or alternatively, the analysis compute device 110 may monitor the network-accessible content for search engine marketing ("SEM") tests, in which one of multiple different variants on a set of words or phrases (a "headline") appear in search results in association with a given set of keywords provided to a search engine, as indicated in block 334. For example, one variant of the headline associated with the keyword "smoothies" may be "Smoothies Shipped To Your Door Get $25 Off" while another variant may be "Smoothies Shipped To Your Door—Get $25 Off." The headline, for a variant, is associated with a link to a web page (a "landing page") in the search results.

As indicated in block 336, the analysis compute device 110, in the illustrative embodiment, obtains samples of the network-accessible content. In doing so, and as indicated in block 338, the analysis compute device 110 may access the network-accessible content using a headless browser (e.g., a program that parses and renders source code, such as HTML, that defines the network-accessible content without presenting a graphical user interface). As indicated in block 340, to reduce the possibility that the servers providing the content (e.g., the content server compute device(s) 114, 116) are able to identify the analysis compute device 110 from a previous access request, the analysis compute device 110 accesses the network-accessible content using a new session (e.g., a new instantiation that does not retain cookies or cached data from a previous access request). Additionally or alternatively, and as indicated in block 342, the analysis compute device 110, may access the network-accessible content from a range (e.g., multiple different) of source addresses (e.g., internet protocol (IP)) addresses to create the impression that the analysis compute device 110 is actually different users accessing the content from different devices. By reducing or eliminating the ability of the content server compute devices 114, 116 to detect that the same device (i.e., the analysis compute device 110) is obtaining the samples of the network-accessible content, the content server compute devices 114, 116 are more likely to provide different variants of the content, rather than repeatedly providing the same variant to the device (e.g., for consistency).

As indicated in block 344, the analysis compute device 110 accesses the content at a predefined frequency. For example, and as indicated in block 346, the analysis compute device 110 may access the content ten times a day (e.g., accessing the same URL ten times a day, etc.). In obtaining samples, in the illustrative embodiment, the analysis compute device 110 performs one or more operations to obtain consistent samples of each piece of content (e.g., each web page), as indicated in block 348. In doing so, the analysis compute device 110 may pause animations (e.g., cascading style sheet (CSS) animations) present in the network-accessible content (e.g., on the web page), as indicated in block 350. Similarly, the analysis compute device 110 may stop any videos at the first frame, as indicated in block 352. Further, the analysis compute device 110 may remove elements that produce random output (e.g., counters, advertisements, chat windows, etc.), as indicated in block 354. By performing the operation(s), the analysis compute device 110 may reduce the likelihood that multiple samples of the same variant appear to be samples of different variants. As indicated in block 356, the analysis compute device 110 may obtain a screen shot (e.g., a rendered image of the content as it would appear on a display device). In doing so, the analysis compute device 110 obtains all rendered text (e.g., excluding text that is present in the source code (e.g., HTML) that is not to be rendered for viewing by a human), as indicated in block 358. As indicated in block 360, the analysis compute device 110 obtains the rendered source code (e.g., HTML) without (e.g., by redacting) components that are unrelated to the display of the content. As non-limiting examples, the analysis compute device 110 may redact any hidden form fields, inline frames ("iframes"), "tabindex" and "data" attributes of elements, and/or tracking scripts or tracking pixels, as those components may change among the samples while the visual appearance (e.g., the rendered version) of the sample remains consistent across those samples. In other embodiments, the analysis compute device 110 may take additional or alternative measures to remove components from the source code that are unrelated to the display of the content. By stripping out such components that could change in the underlying source code (HTML) without affecting the visual appearance of the content, the analysis compute device 110 lowers the likelihood of identifying multiple samples as different variants, while, from a human viewer's perspective those samples would represent the same variant of the network-accessible content. Subsequently, the method 300 advances to block 362 of FIG. 5, in which the analysis compute device 110 determines whether multiple variants of each item of network-accessible content were present (e.g., were accessed from the content server compute devices 114, 116) based on the obtained samples.

Figure 5:
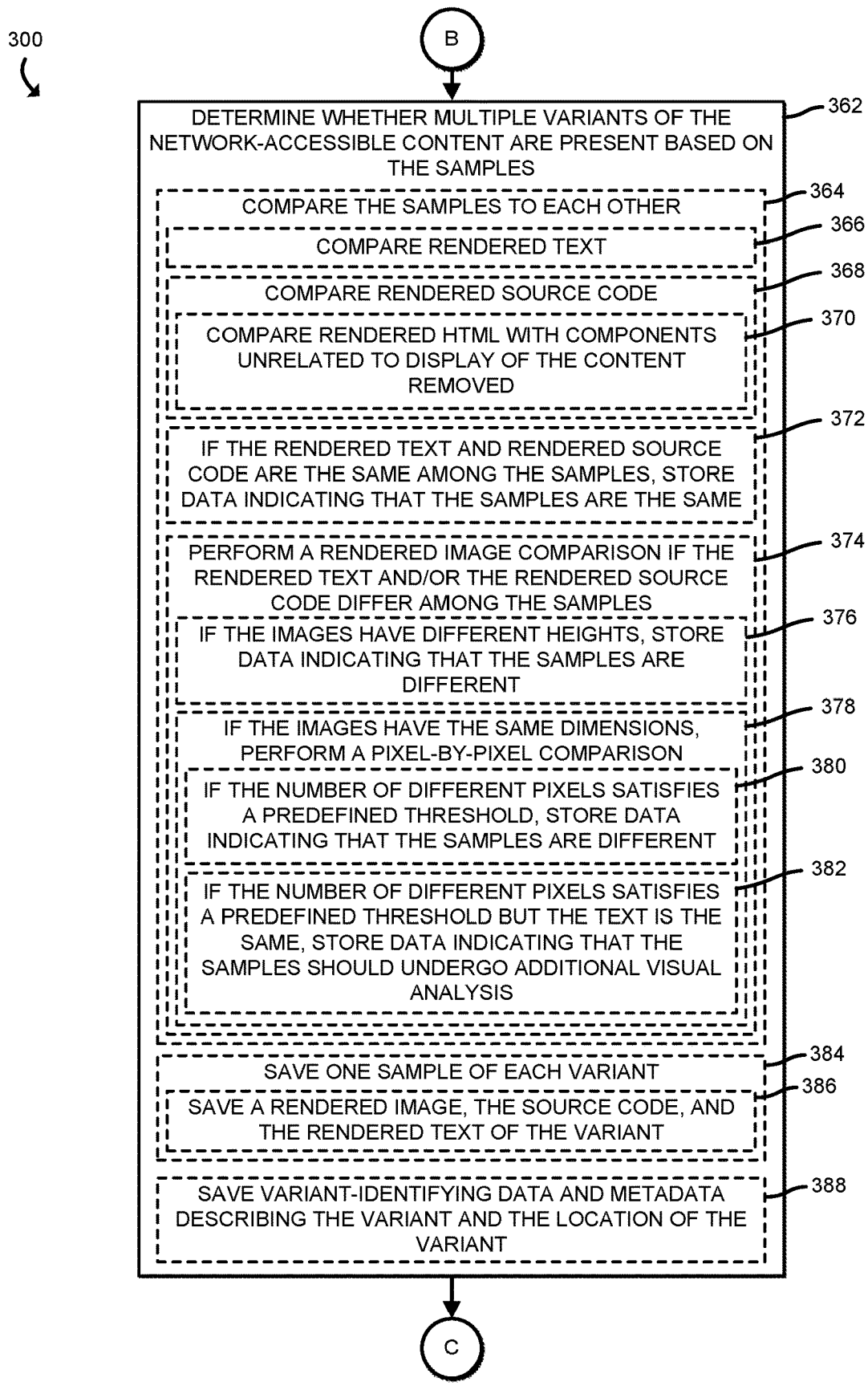

Referring now to FIG. 5, in determining whether multiple variants of a given item of network-accessible content are present based on the samples, the analysis compute device 110 compares the samples of each item of content to each other, as indicated in block 364. In doing so, the analysis compute device 110 compares the rendered text across the samples, as indicated in block 366. Additionally, as indicated in block 368, the analysis compute device 110 compares the rendered source code (e.g., HTML). In doing so, in the illustrative embodiment, the analysis compute device 110 compares the rendered source code (e.g., HTML) with components unrelated to the display of the content removed (e.g., the components described relative to block 360), as indicated in block 370. In the illustrative embodiment, if the rendered text and the rendered source code (e.g., HTML) are the same among the samples, the analysis compute device 110 stores data indicating that the samples are the same (e.g., samples of the same variant), as indicated in block 372. Further, in the illustrative embodiment, if the rendered text and/or the rendered source code (e.g., HTML) differ among multiple samples, the analysis compute device 110 performs a rendered image comparison of the samples, as indicated in block 374. In doing so, and as indicated in block 376, the analysis compute device 110 stores data indicating that the samples are of different variants if the images have different dimensions (e.g., heights or widths). If the images have the same dimensions, the analysis compute device 110, in the illustrative embodiment, performs a pixel-by-pixel comparison of the samples, as indicated in block 378. In doing so, the analysis compute device 110 stores data indicating that the samples are different (e.g., of different variants) if the number of different pixels between the samples satisfies a predefined threshold (e.g., if the number of different pixels meets and/or exceeds some predefined number of pixels, such as at least a thousand pixels, or meets and/or exceeds some predefined percentage of total pixels in the sample), as indicated in block 380. Alternatively, and as indicated in block 382, if the number of different pixels satisfies a predefined threshold, but the text is the same in the compared samples, the analysis compute device 110 stores data indicating that the samples should undergo additional visual analysis (e.g., by a human, by a neural network trained to perform computer vision operations, etc.).

As indicated in block 384, the analysis compute device 110 saves a single sample of each detected variant (e.g., storing one sample per unique variant and discarding any additional samples of any of the variants). In doing so, and as indicated in block 386, the analysis compute device 110 saves a rendered image, the source code (e.g., HTML), and the rendered text of each unique variant. Further, in the illustrative embodiment, the analysis compute device 110 saves variant-identify data (e.g., any data that identifies a variant, such as a unique alphanumeric sequence) and metadata that describes the variant and the location of the variant (e.g., the URL used to access the variant) in a data set, as indicated in block 388. Subsequently, the method 300 advances to block 390 of FIG. 6, in which the analysis compute device 110 determines the subsequent course of action as a function of whether multiple variants of network-accessible content (e.g., multiple variants of a web page at a given URL) were found.

Figure 6:
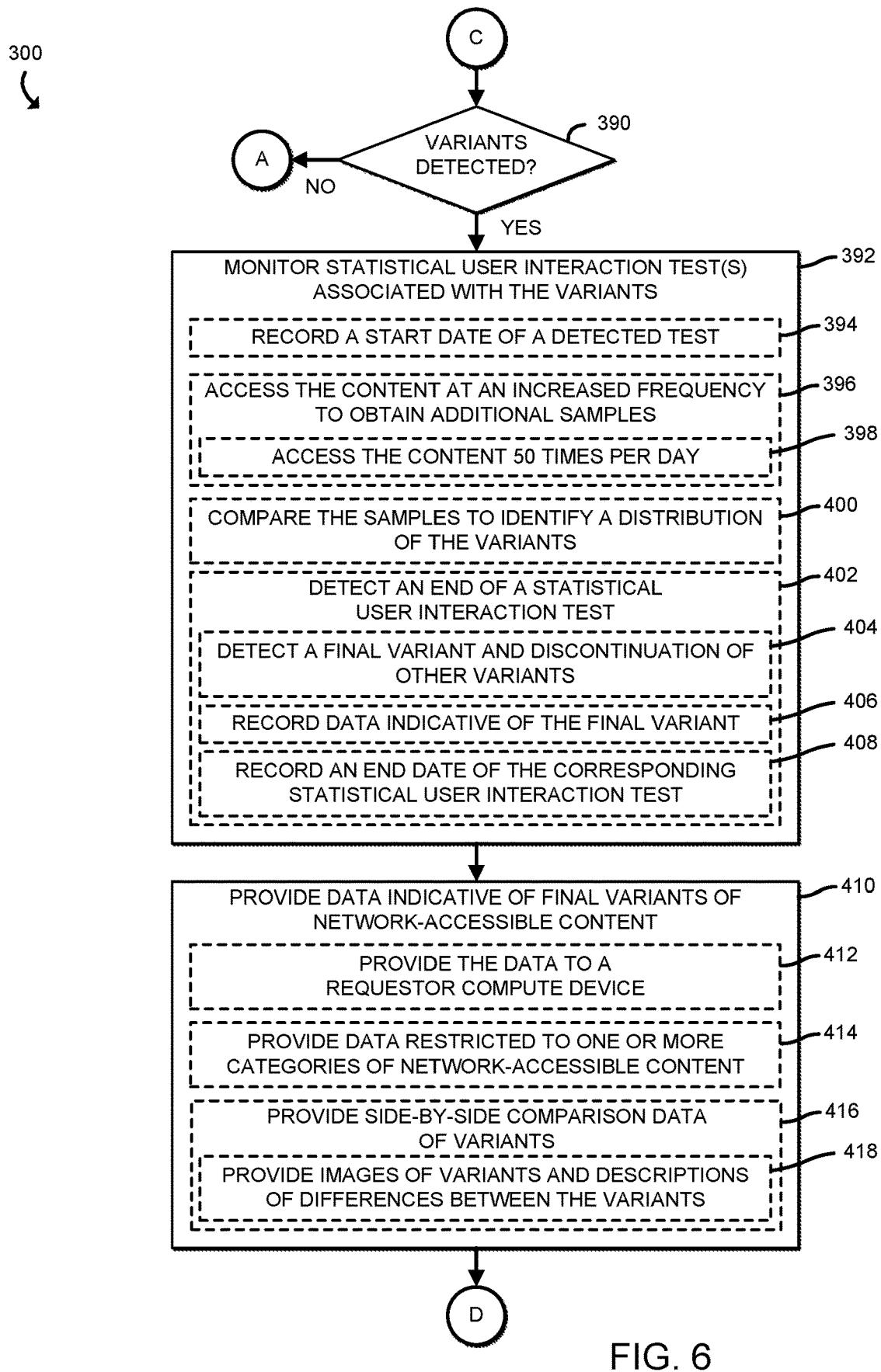

Referring now to FIG. 6, if multiple variants were not found, the method 300 loops back to block 330 of FIG. 4, in which the analysis compute device 110 continues to monitor the network-accessible content to detect a user interaction test. Otherwise (e.g., if variants were found), the method 300 advances to block 392 in which the analysis compute device 110 monitors one or more statistical user interaction tests (e.g., one for each item of network-accessible content having multiple variants). In doing so, and as indicated in block 394, the analysis compute device 110 records a start date of a detected test. As indicated in block 396, the analysis compute device 110, in the illustrative embodiment, accesses the network-accessible content at an increased frequency in order to obtain additional samples to obtain a set of samples of sufficient size to determine the distribution or ratio of different variants within the test. For example, and as indicated in block 398, the analysis compute device 110 may access the content (e.g., a web site at a URL where a statistical user interaction test has been detected) fifty times a day. In other embodiments, the analysis compute device 110 may access the content at a different frequency. In block 400, the analysis compute device 110 compares the samples to identify a distribution of the variants (e.g., a percentage of the total number of samples that each variant represents). Additionally, the analysis compute device 110, in the illustrative embodiment, detects an end of one or more statistical user interaction tests, as indicated in block 402. In doing so, the analysis compute device 110 detects a final variant and a discontinuation of the other variants of a particular item of network-accessible content (e.g., variant B represents 100% of the distribution and variant A has been discontinued, representing 0% of the distribution of the obtained samples), as indicated in block 404. Further, the analysis compute device 110 records data indicative of the final variant (e.g., an indication that a corresponding sample represents the final variant), as indicated in block 406. In addition, the analysis compute device 110 records the end date of the corresponding statistical user interaction test, as indicated in block 408.

Figure 10:
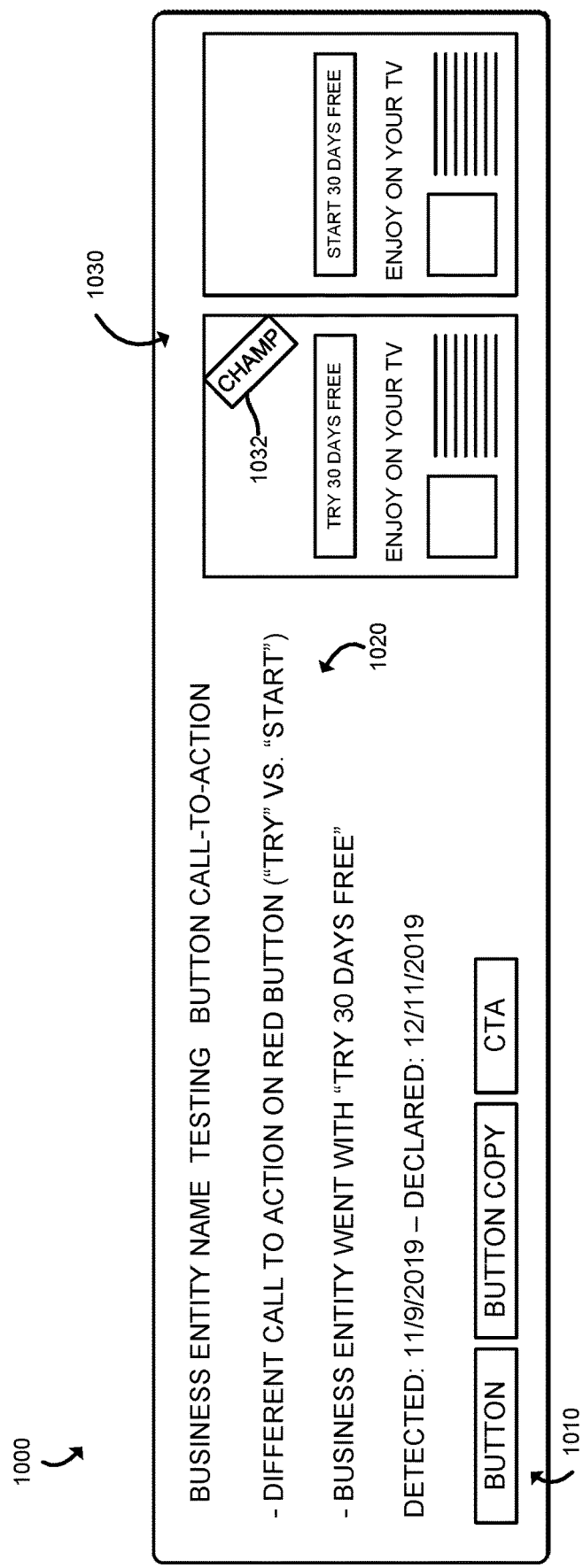
FIG. 10 is a simplified diagram of at least one embodiment of a report produced by the analysis compute device from the detection and analysis of an AB test.
Figure 11:
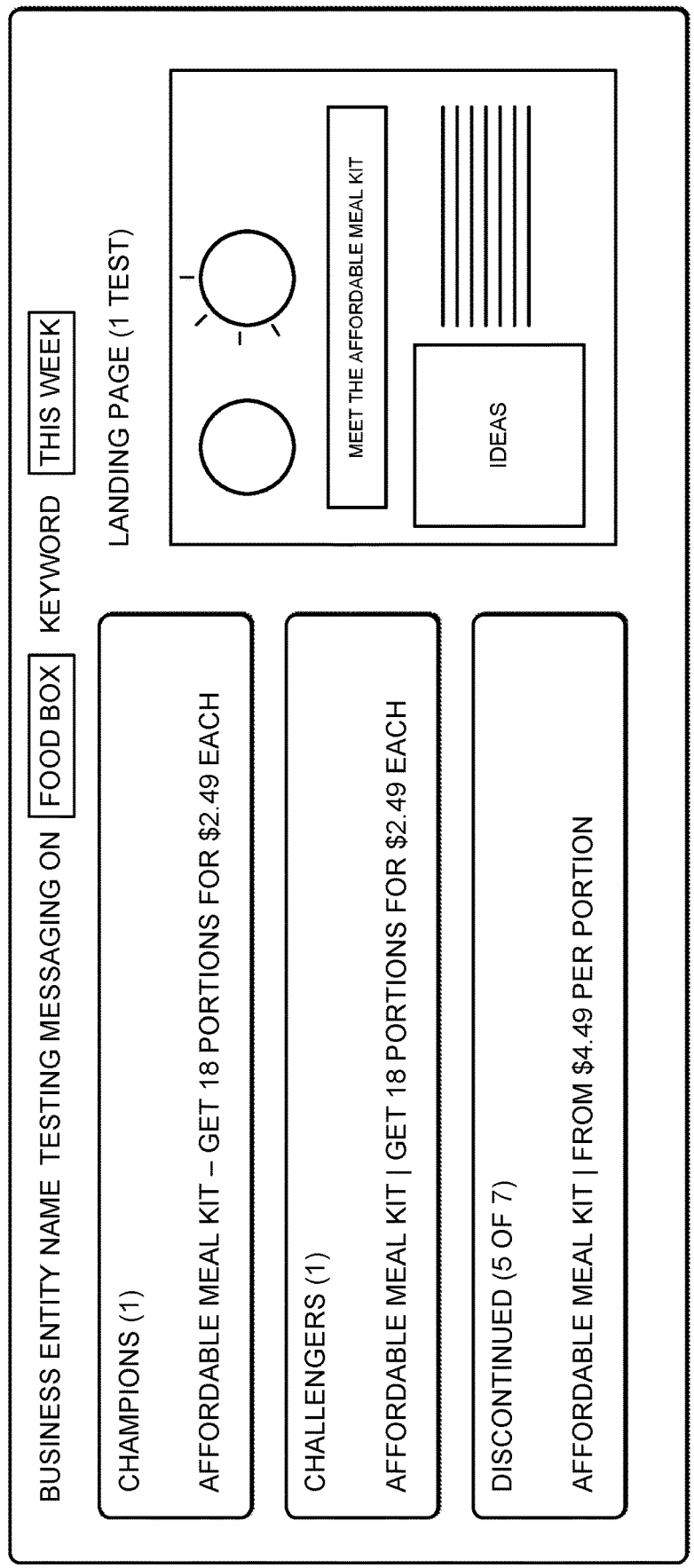
FIG. 11 is a simplified diagram of at least one embodiment of a report produced by the analysis compute device from the detection and analysis of a search engine marketing test.

Subsequently, in block 410, the analysis compute device 110 may provide data indicative of final variants of network-accessible content (e.g., from the detected and monitored user interaction tests described above). As indicated in block 412, the analysis compute device 110 may provide the data to a requestor compute device (e.g., a device that sent a request to the analysis compute device 110 for the data), such as the requestor compute device 112. In some embodiments, the analysis compute device 110 may provide a subset of the data that is restricted to one or more categories (e.g., the categories of block 310) of the network-accessible content (e.g., A/B tests associated with a desired user response of signing up for a trial of a movie streaming service), as indicated in block 414. In providing the data, the analysis compute device 110 may provide side-by-side comparison data which may be embodied as any data that represents features of the variants identified in the user interaction test and the final variant (e.g., the most successful variant in obtaining the desired user response), as indicated in block 416. In doing so, and as indicated in block 418, the analysis compute device 110 may provide images of the variants and descriptions of differences between the variants. Referring briefly to FIG. 10, the analysis compute device 110 may produce a viewable report 1000 (e.g., sent to the requestor compute device 112) having side-by-side comparison data. The report 1000 illustratively includes tags 1010 identifying a component of the corresponding web page that differed between variants in the A/B test and the type of challenge (e.g., call to action). The report 1000 also illustratively includes a textual description 1020 of the differences between variants, a description of the final (e.g., successful) variant, and the time period in which the A/B test occurred. Further, the report 1000 includes a side-by-side visual representation 1030 of the variants in the test and a visual identifier 1032 of the final variant. Referring briefly to FIG. 11, the analysis compute device 110 may produce a report 1100 based on the detection and analysis of a search engine marketing test that indicates a successful variant and other variants that have been discontinued or that are presently being tested. Referring back to the method 300, the analysis compute device 110 may additionally provide data indicative of patterns among final variants of network-accessible content in block 420 of FIG. 7.

Figure 7:
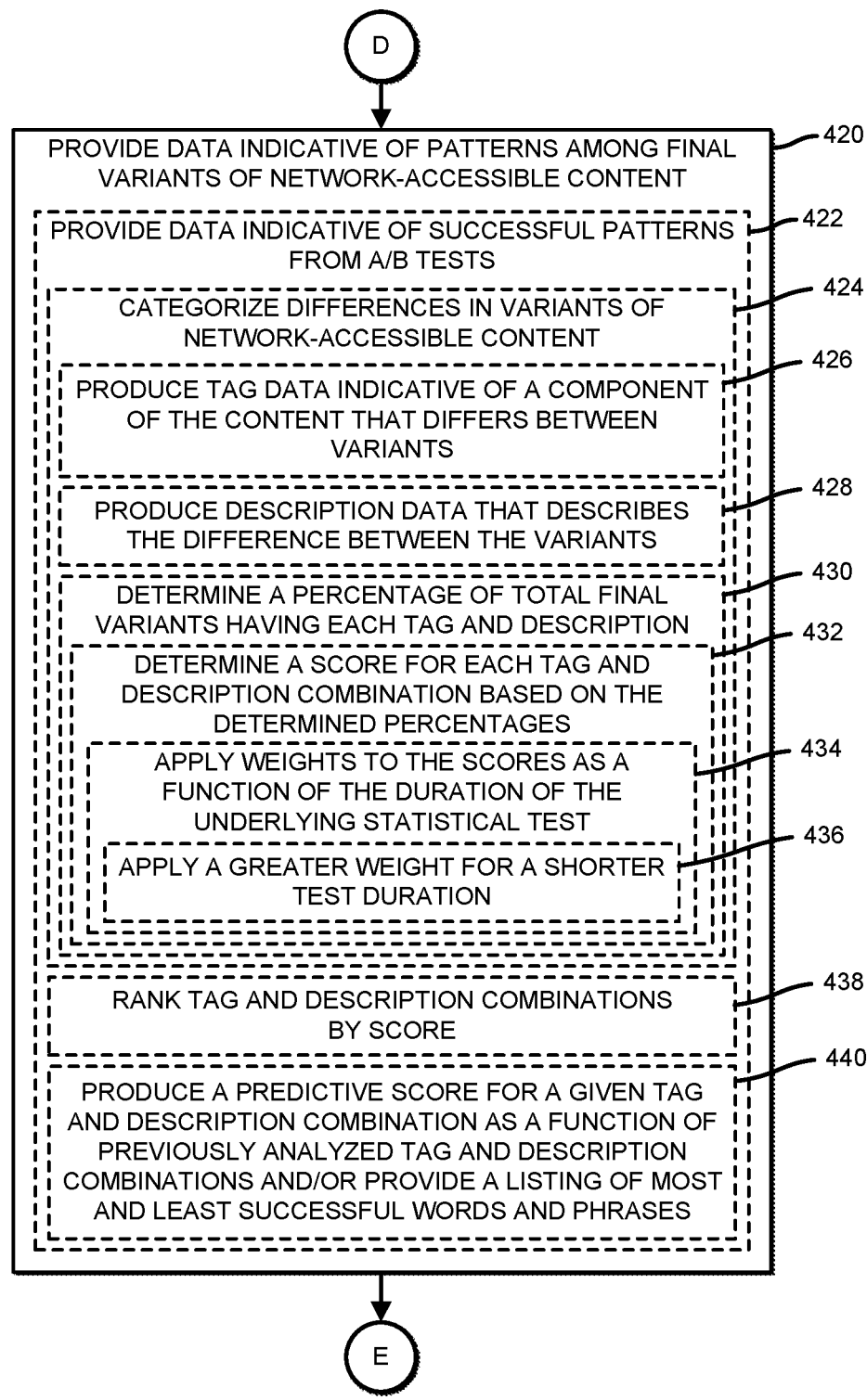

Referring now to FIG. 7, in providing data indicative of patterns in final variants, the analysis compute device 110, provides data indicative of successful patterns detected from A/B tests, as indicated in block 422. In the illustrative embodiment, the analysis compute device 110 categorizes differences in variants of the network-accessible content (e.g. different variants of a web page at a particular URL), as indicated in block 424. In doing so, and as indicated in block 426, the analysis compute device 110 produces tag data, which may be embodied as any data (e.g., a one or two word identifier, a graphical element such as an arrow or an outline, etc.) that identifies a component of the content (e.g., a portion of the web page) that differs between variants (e.g., a tag identifying a particular button, which has a different label depending on the variant). The analysis compute device 110, in block 428, may also produce description data, which may be embodied as any data (e.g., human readable text) that describes the difference(s) between the variants. For example, for variant A, which was unsuccessful, the description data may be "The button to activate a trial is labeled with 'Start'" while the description data for variant B, which was successful, is "The button to activate a trial is labeled with 'Try'".

As indicated in block 430, the analysis compute device 110, in the illustrative embodiment, determines a percentage of total final variants (e.g., successful variants) having each tag (e.g., similar tag data from 426) and description (e.g., similar description data from block 428). Further, and as indicated in block 432, the illustrative analysis compute device 110 determines a score for each tag and description combination based on the determined percentages (e.g., assigning a higher score for tag and description combinations present in a higher percentage of the final variants and assigning a lower score for tag and description combinations present in a lower percentage of the final variants). In doing so, and as indicated in block 434, the analysis compute device 110 may apply weights to the scores as a function of the duration of the underlying statistical test (e.g., A/B test), as indicated in block 434. For example, and as indicated in block 436, the analysis compute device 110 may apply a greater weight for a relatively short test duration or a lesser weight for a relatively long test duration. A weight, in the illustrative embodiment, is a factor (i.e., a multiplier) that adjusts the score in a direct relationship with the weight. For example, if the weight is increased (e.g., from 1.0 to 1.2), the score is likewise increased and, conversely, if the weight is decreased (e.g., from 1.0 to 0.8), the score is likewise decreased. In some embodiments, the analysis compute device 110 may group all tests by tag and description for each variant, calculate the number of times a tag/description appears in winning variants, divided by the total number of winning variants, calculate the number of times a tag/description appears in losing variants, divided by the total number of losing variants, and divide both numbers to obtain a score indicative of the likelihood that a proposed change will result in a successful variant, while optionally applying the weights described above.

As indicated in block 438, the analysis compute device 110, in the illustrative embodiment, ranks the tag and description combinations by their scores (e.g., determined in block 432). The analysis compute device 110, as indicated in block 440, may also produce a predictive score for a given tag and description combination (e.g., a tag and description combination submitted to the analysis compute device 110 from the requestor compute device 112). For example, the analysis compute device 110 may train a neural network using results from known tag and description combinations to accurately predict their known scores, and provide a proposed tag and description combination (e.g., from the requestor compute device 112) to the neural network to produce a prediction of the score. As also indicated in block 440, the analysis compute device 110 may provide a listing (e.g., to the requestor compute device 112) of the most successful and least successful words or phrases (e.g., the top twenty and the bottom twenty) used in variants in the AB tests detected and analyzed by the analysis compute device 110.

Figure 8:
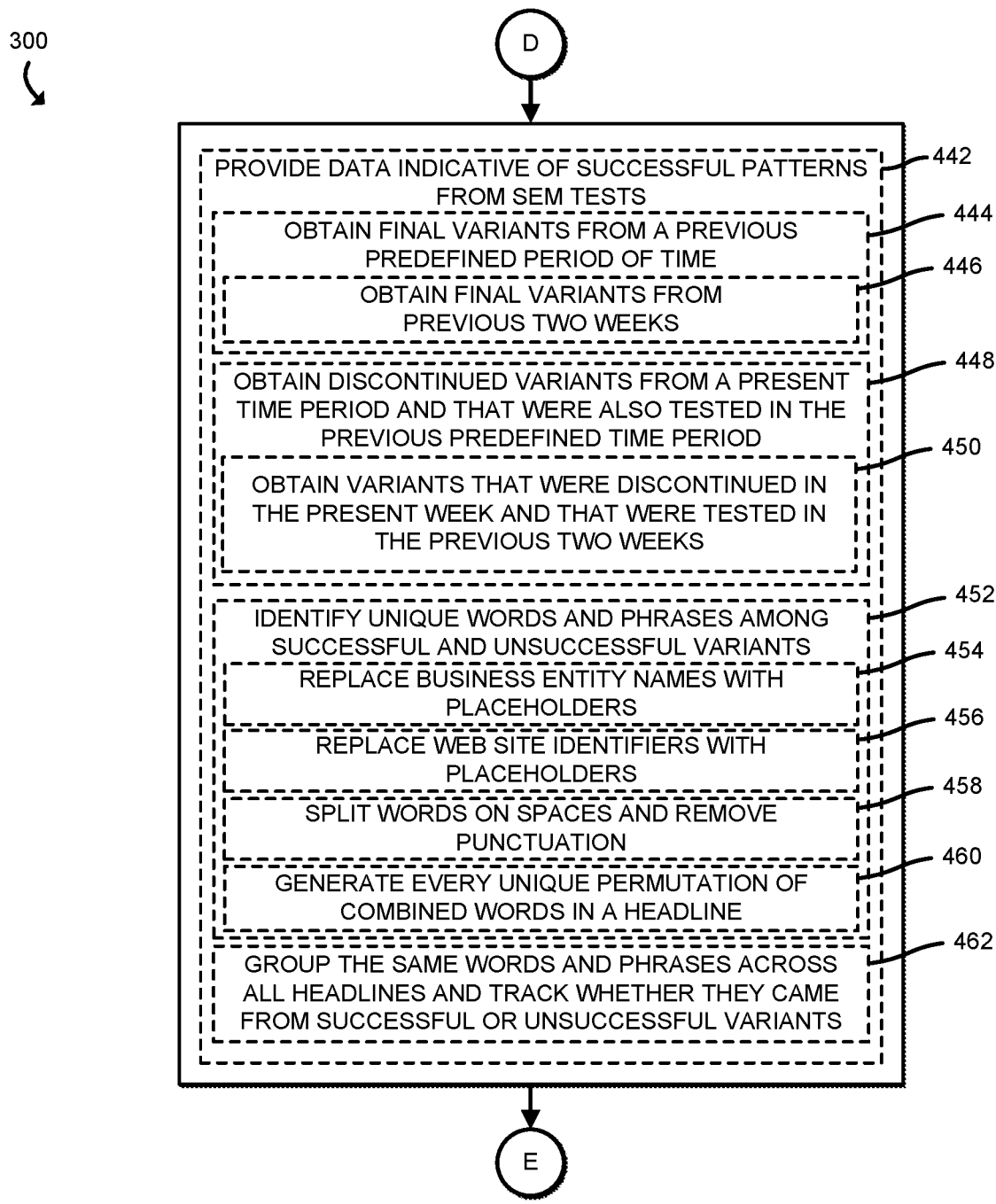

Referring now to FIG. 8, the analysis compute device 110 may similarly provide data indicative of successful patterns from search engine marketing ("SEM") tests, as indicated in block 442. In doing so, and as indicated in block 444, the analysis compute device 110 may obtain final variants from a previous predefined period of time. For example, and as indicated in block 446, the analysis compute device 110 may provide final variants from the previous two weeks (e.g., two weeks prior to the date on which a request to perform the analysis is received by the analysis compute device 110). As indicated in block 448, the analysis compute device 110 may obtain discontinued variants that are from a present time period and that were also tested in the previous predefined time period. For example, and as indicated in block 450, the analysis compute device 110 may obtain variants that were discontinued in the present week and that were tested in the previous two weeks. As indicated in block 452, the analysis compute device 110 identifies unique words and phrases among successful and unsuccessful variants. In doing so, the analysis compute device 110, in the illustrative embodiment, replaces business entity names (e.g., company names) with placeholders (e.g., a predefined character or set of characters), as indicated in block 454, replaces web site identifiers (e.g., URLs) with placeholders, as indicated in block 456, splits words on spaces (e.g., utilizes spaces as a delimiter between words) and removes punctuation, as indicated in block 458, and generates every unique permutation of combined words in a headline (e.g., if the headline includes word A, word B, and word C, the permutations would be every possible ordering of words A, B, and C), as indicated in block 460. As indicated in block 462, the analysis compute device 110, in the illustrative embodiment, groups the same words and phrases across all headlines and tracks whether they came from successful or unsuccessful variants.

Figure 9:
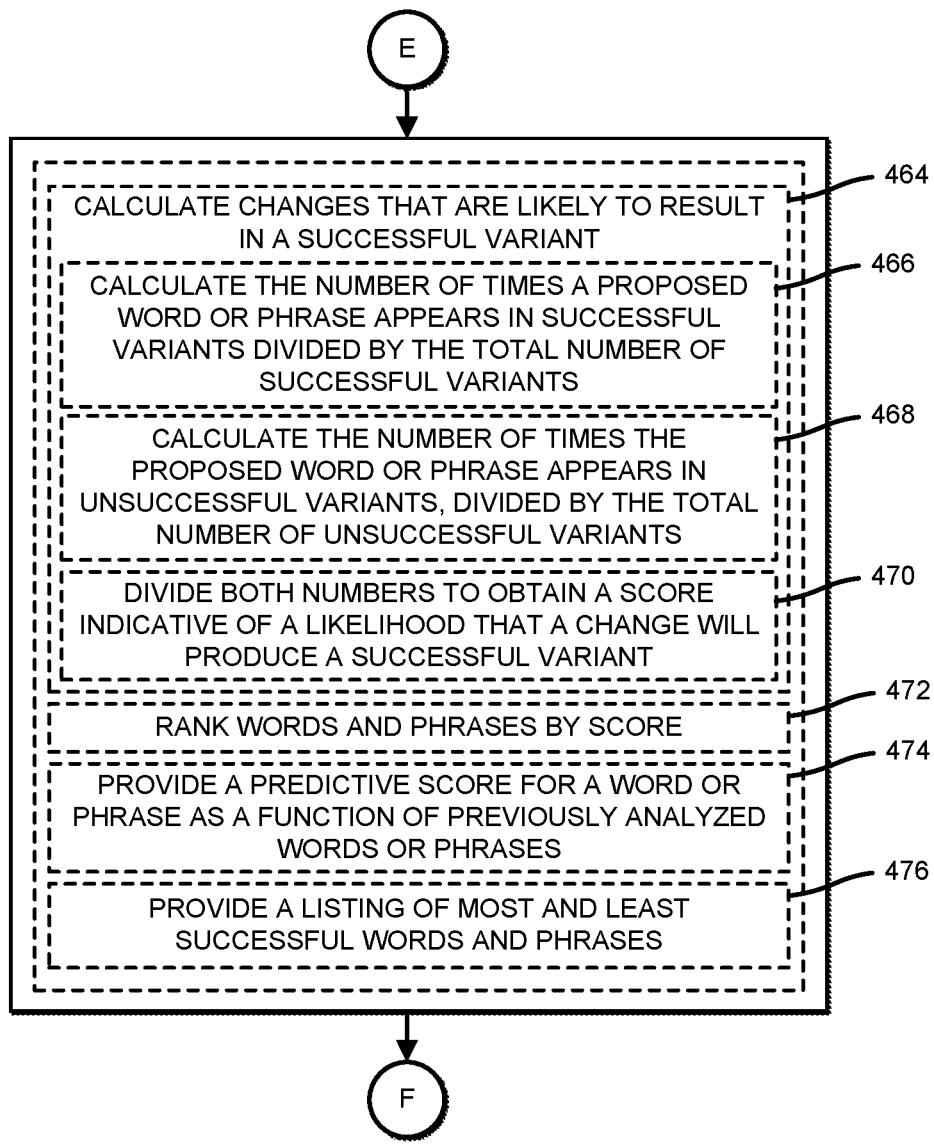

Referring now to FIG. 9, the analysis compute device 110 may calculate changes that are likely to result in a successful variant, based on previous SEM tests, as indicated in block 464. In doing so, and as indicated in block 466, the analysis compute device 110 may calculate the number of times a proposed word or phrase (e.g., a word or phrase submitted by the requestor compute device 112) appears in successful variants (e.g., final variants) divided by the total number of successful variants. As indicated in block 468, the analysis compute device 110 may calculate the number of times the proposed word or phrase appears in unsuccessful variants, divided by the total number of unsuccessful variants. The analysis compute device 110 may also weight results of tests that ran quickly more heavily, similar to block 434 of FIG. 7. In block 470, the analysis compute device 110 may divide both numbers (e.g., from blocks 466 and 468) to obtain a score that is indicative of a likelihood that a proposed change (e.g., a proposed word or phrase) will produce a successful variant (e.g., of a headline for use in search engine marketing). As indicated in block 472, the analysis compute device 110 ranks words and phrases by their corresponding scores. Additionally, and as indicated in block 474, the analysis compute device 110 may provide a predictive score for any word or phrase as a function of previously analyzed words or phrases (e.g., using a neural network that has been trained to accurately predict known scores for known words or phrases used in search engine marketing tests). Additionally or alternatively, the analysis compute device 110 may provide a listing of the most successful (e.g., top twenty) and least successful (e.g., bottom twenty) words and phrases used in SEM tests that were detected and analyzed by the analysis compute device 110. Subsequently, the method 300 loops back to block 304 of FIG. 3 to potentially obtain more locations of network-accessible content to be monitored for statistical user interaction tests. While shown as being performed in a particular sequence, it should be understood that the operations described with reference to the method 300 may be performed in a different order and/or concurrently (e.g., the analysis compute device 110 may continually obtain locations for network-accessible content while concurrently monitoring for statistical user interaction tests and identifying differences between successful and unsuccessful variants of network-accessible content).

The invention claimed is:

1. A compute device comprising:
   circuitry to:
   obtain samples of network-accessible content;
   determine, based on the obtained samples, whether multiple variants of the network-accessible content are present;
   monitor, in response to a determination that multiple variants are present, a statistical user interaction test to measure an effectiveness of each variant of the network-accessible content in obtaining a predefined user response, including detecting a final variant and discontinuation of other variants in the statistical user interaction test; and
   provide data indicative of the detected final variant of the network-accessible content.

2. The compute device of claim 1, wherein the circuitry is further to provide data indicative of patterns among final variants from multiple statistical user interaction tests.

3. The compute device of claim 2, wherein to provide the data indicative of patterns comprises to produce tag data indicative of a component of the network-accessible content that differs between variants and produce description data that describes a difference between the variants.

4. The compute device of claim 1, wherein to obtain samples of the network-accessible content comprises to (i) redact, from source code of the network-accessible content, one or more components unrelated to the display of the content including a tracking script or tracking pixel or (ii) perform operations to obtain consistent samples, including removing, from source code of the network-accessible content, one or more elements that produce random output including pausing at least one animation or stopping a video at a first frame.

5. The compute device of claim 1, wherein the circuitry is further to compare the samples to each other to determine whether variants are present.

6. The compute device of claim 5, wherein to compare the samples comprises to:
   compare rendered text in each sample; and
   compare rendered source code with components unrelated to display of the network-accessible content removed.

7. The compute device of claim 6, wherein the circuitry is further to store, in response to a determination that the rendered text and rendered source code are the same among the samples, data indicating that the samples are the same.

8. The compute device of claim 6, wherein the circuitry is further to perform, in response to a determination that the rendered text or the rendered source code differs among the samples, a rendered image comparison of the samples.

9. The compute device of claim 8, wherein to perform a rendered image comparison comprises to perform a pixel-by-pixel comparison and determine whether a predefined threshold number of pixels differ between the samples.

10. The compute device of claim 1, wherein to obtain samples of the network-accessible content comprises to access the network-accessible content using a headless browser.

11. The compute device of claim 10, wherein to obtain samples of the network-accessible content comprises to access the network-accessible content using a new headless browser session for each access.

12. The compute device of claim 10, wherein to obtain samples of the network-accessible content comprises to access the network-accessible content from a range of source addresses.

13. The compute device of claim 1, wherein to obtain the samples comprises to access the network-accessible content at a first frequency and wherein to monitor the statistical user interaction test comprises to access the network-accessible content at a second frequency that is greater than the first frequency.

14. One or more machine-readable storage media comprising a plurality of instructions stored thereon that, in response to being executed, cause a compute device to:
   obtain samples of network-accessible content;
   determine, based on the obtained samples, whether multiple variants of the network-accessible content are present;
   monitor, in response to a determination that multiple variants are present, a statistical user interaction test to measure an effectiveness of each variant of the network-accessible content in obtaining a predefined user response, including detecting a final variant and discontinuation of other variants in the statistical user interaction test; and
   provide data indicative of the detected final variant of the network-accessible content.

15. The one or more machine-readable storage media of claim 14, wherein the instructions additionally cause the compute device to provide data indicative of patterns among final variants from multiple statistical user interaction tests.

16. The one or more machine-readable storage media of claim 15, wherein to provide the data indicative of patterns comprises to produce tag data indicative of a component of the network-accessible content that differs between variants and produce description data that describes a difference between the variants.

17. The one or more machine-readable storage media of claim 14, wherein to obtain samples of the network-accessible content comprises to (i) redact, from source code of the network-accessible content, one or more components unrelated to the display of the content including a tracking script or tracking pixel or (ii) perform operations to obtain consistent samples, including removing, from source code of the network-accessible content, one or more elements that produce random output including pausing at least one animation or stopping a video at a first frame.

18. The one or more machine-readable storage media of claim 14, wherein the instructions additionally cause the compute device to compare the samples to each other to determine whether variants are present.

19. A method comprising:
  obtaining, by a compute device, samples of network-accessible content;
  determining, by the compute device and based on the obtained samples, whether multiple variants of the network-accessible content are present;
  monitoring, by the compute device and in response to a determination that multiple variants are present, a statistical user interaction test to measure an effectiveness of each variant of the network-accessible content in obtaining a predefined user response, including detecting a final variant and discontinuation of other variants in the statistical user interaction test; and
  providing, by the compute device, data indicative of the detected final variant of the network-accessible content.

20. The method of claim 19, further comprising providing data indicative of patterns among final variants from multiple statistical user interaction tests.

\* \* \* \* \*